(12) United States Patent
Terkowitz et al.

(10) Patent No.: US 10,803,166 B1
(45) Date of Patent: Oct. 13, 2020

(54) AUTOMATED DETERMINATION OF APPLICATION PRIVILEGES

(71) Applicant: Amazon Technologies, Inc., Seattle, WA (US)

(72) Inventors: Michael Sturgis Terkowitz, Seattle, WA (US); Donna Yinghui Xu, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 365 days.

(21) Appl. No.: 15/861,601

(22) Filed: Jan. 3, 2018

(51) Int. Cl.
| | |
|---|---|
| *G06F 11/30* | (2006.01) |
| *G06F 21/53* | (2013.01) |
| *G06F 21/51* | (2013.01) |
| *G06F 8/75* | (2018.01) |

(52) U.S. Cl.
CPC .............. *G06F 21/53* (2013.01); *G06F 8/75* (2013.01); *G06F 11/302* (2013.01); *G06F 21/51* (2013.01)

(58) Field of Classification Search
None
See application file for complete search history.

(56) References Cited

U.S. PATENT DOCUMENTS

| | | | | |
|---|---|---|---|---|
| 5,838,766 | A * | 11/1998 | Rand | H04Q 1/24 379/9 |
| 9,152,541 | B1 * | 10/2015 | Kuo | G06F 11/3672 |
| 2007/0174899 | A1 * | 7/2007 | Broberg | G06F 21/6218 726/4 |
| 2008/0250493 | A1 * | 10/2008 | Bassani | G06F 21/604 726/17 |
| 2011/0078113 | A1 * | 3/2011 | Franz | G06F 16/273 707/634 |
| 2017/0286265 | A1 * | 10/2017 | Moth | G06F 11/3644 |

* cited by examiner

*Primary Examiner* — Joseph P Hirl
*Assistant Examiner* — Hassan Saadoun
(74) *Attorney, Agent, or Firm* — Thomas | Horstemeyer, LLP

(57) ABSTRACT

Disclosed are various embodiments for automated determination of application privileges. An application testing service executes an application in a testing computing environment that replicates a production computing environment. The application is given a set of permissions in the testing computing environment. A set of use cases for the application is performed while the application is executing in the testing computing environment. A set of operations invoked by the application to perform the set of use cases is determined. A subset of the set of permissions is generated that corresponds to a minimal set of permissions necessary to invoke the set of operations.

20 Claims, 6 Drawing Sheets

Application Test Complete

Testing of MyApplication v0.1.9_alpha has completed, and 459 use cases were performed.

Operations were performed that required the following permissions:

- Location Access
- Record from Microphone
- Camera Access
- Contacts (Read Only)
- Draw Over Other Applications

103

( Generate Application Manifest )

106

( Apply Permissions to Hosted Environment )

AUTOMATED DETERMINATION OF APPLICATION PRIVILEGES

BACKGROUND

The principle of least privilege in computing is a design principle for information security that every application or user should have access only to the minimum set of resources that are necessary for legitimate purposes. As an example, an account that is used solely for creating backups of data should not have access to install new applications. As another example, a mobile application that is a calculator should not have access to a camera in a mobile device. By applying the principle of least privilege, computer systems can benefit from improved fault tolerance, security, and ease of deployment for applications.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIG. 1 is a drawing of a user interface involving an example scenario according to an embodiment of the present disclosure.

DETAILED DESCRIPTION

Figure 2:
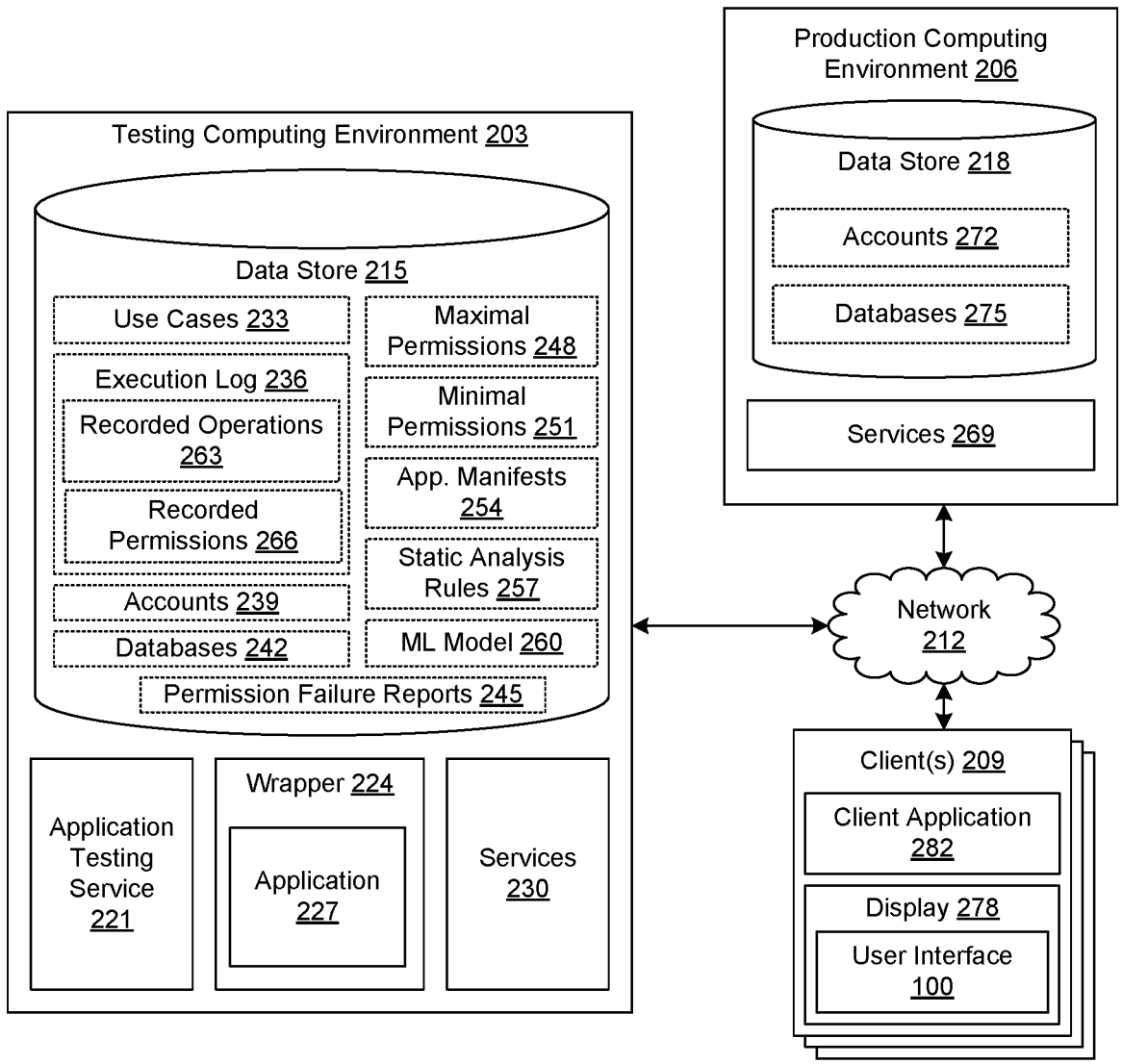
FIG. 2 is a schematic block diagram of a networked environment according to various embodiments of the present disclosure.

The present disclosure relates to automated determination of privileges for computer software applications. Under the principle of least privilege, it is desirable to assign the minimum set of privileges possible to an application for the application to perform its intended functions. Consequently, if the application is compromised or has defects involving stability, the impact of the compromise or defects are contained to the minimum set of resources. Although the principle of least privilege offers important benefits in theory, it is often not applied in practice. In particular, it is difficult to determine exactly what permissions are necessary for an application to perform its intended functions. Also, it may be easier to grant blanket permissions for everything than to request specific permissions. Not requesting permission for a necessary privilege may cause the application to fail in production use. Ultimately, failure to follow the principle of least privilege leads to applications that are less secure but easier to develop.

As an example, suppose that a developer is creating a web service that provides access to relational database tables. The web service may ultimately only need access to a specific table. Moreover, the web service may only need access to read from the specific table and not to write to the specific table. However, advance knowledge of which table is to be accessed may not be feasible. For instance, the table may not actually be created or named until a later stage of development. Also, the developer may want fairly loose permissions during the development process. For instance, code that inserts data into the table may be included in the web service at some point in development but then removed. Having to keep the permissions up to date with the actual state of the code at all stages of development can be error prone, time consuming, and wasteful. Instead, developers often grant blanket permissions and then forget to restrict them upon the release.

Various embodiments of the present disclosure introduce automated approaches to determining a minimum set of permissions or privileges necessary for an application. Through an automated approach, the errors, guesswork, and tedium otherwise associated with a developer manually ascertaining privileges is eliminated, thereby leading to a wider adoption of the principle of least privilege. As will be discussed, an application is executed during development in a testing environment that replicates a production environment. The application is given a maximum set of permissions at this stage, and operations performed by the application during a set of use cases are observed. The minimal permissions necessary to perform the operations are recorded, and the developer can invoke a function to generate a list of the minimal permissions or to automatically configure the application to install with the minimal permissions.

Turning now to FIG. 1, shown is an example user interface 100 involved in an example scenario according to an embodiment of the present disclosure. The user interface 100 presents the result of an application test and the permissions that were determined to be necessary. The user interface 100 may be rendered by a console of a network service or by a locally executed operation. For example, the user interface 100 may be composed of one or more network pages, including hypertext markup language (HTML), extensible markup language (XML), or other elements.

In this non-limiting example, the tested application corresponds to a mobile application, and a number of different use cases were performed. The testing service reports a list of permissions 103 that were necessary to perform the operations associated with the use cases. A component 106 may be provided to cause an application manifest to be generated for the tested application, where the application manifest causes the set of permissions to be requested when the application is installed on a mobile device. A component 109 may be provided to cause the permissions to be applied to a hosted environment. This may involve creating a new account having the desired permissions with one or more network services, or configuring the permissions for an existing account. In the following discussion, a general description of the system and its components is provided, followed by a discussion of the operation of the same.

With reference to FIG. 2, shown is a networked environment 200 according to various embodiments. The networked environment 200 includes a testing computing environment 203, a production computing environment 206, and one or more clients 209, which are in data communication with each other via a network 212. The network 212 includes, for example, the Internet, intranets, extranets, wide area networks (WANs), local area networks (LANs), wired networks, wireless networks, cable networks, satellite networks, or other suitable networks, etc., or any combination of two or more such networks.

The testing computing environment 203 and the production computing environment 206 may each comprise, for example, a server computer or any other system providing computing capability. Alternatively, the testing computing environment 203 and the production computing environment 206 may employ a plurality of computing devices that may be arranged, for example, in one or more server banks or computer banks or other arrangements. Such computing devices may be located in a single installation or may be distributed among many different geographical locations. For example, the testing computing environment 203 and the production computing environment 206 may include a plurality of computing devices that together may comprise a hosted computing resource, a grid computing resource, and/or any other distributed computing arrangement. In some cases, the testing computing environment 203 and the production computing environment 206 may correspond to an elastic computing resource where the allotted capacity of processing, network, storage, or other computing-related resources may vary over time.

In some embodiments, the testing computing environment 203 and the production computing environment 206 may each correspond to separate networks and systems. In other embodiments, the testing computing environment 203 and the production computing environment 206 may leverage the same computing systems and infrastructure and may correspond to logical separations. For example, the testing computing environment 203 and the production computing environment 206 may utilize different accounts on the same network services, different databases hosted through the same database servers, and so forth.

Various applications and/or other functionality may be executed in the testing computing environment 203 and the production computing environment 206 according to various embodiments. Also, various data is stored in a data store 215 that is accessible to the testing computing environment 203 and a data store 218 that is accessible to the production computing environment 206. The data store 215 and 218 may each be representative of a plurality of data stores 215, 218 as can be appreciated. The data stored in the data stores 215, 218, for example, is associated with the operation of the various applications and/or functional entities described below.

The components executed on the testing computing environment 203, for example, include an application testing service 221, a wrapper 224 for an application 227 under development, services 230, and other applications, services, processes, systems, engines, or functionality not discussed in detail herein. The application testing service 221 is executed to perform testing on the application 227 under development. In various embodiments, the application testing service 221 may be integrated into a development environment or may be provided as a service to multiple customers by a utility computing provider. The application testing service 221 may initialize or create a replica of the production computing environment 206, or portions thereof, within the testing computing environment 203 for testing purposes. The application testing service 221 may then execute the application 227 with a maximal set of permissions and observe which operations are performed by the application 227. A minimal set of permissions to perform the operations can be determined by the application testing service 221 and generated in various formats and methods.

The wrapper 224 may be used as part of replicating or simulating the production computing environment 206. To this end, the wrapper 224 may be configured to intercept application programming interface (API) calls, system calls, network communications, and so on, from the application 227 as it executes. The wrapper 224 may provide simulated data to the application 227 in lieu of replicated data from the production computing environment 206. In various implementations, the wrapper 224 may virtualize or emulate resources of a computing device. For example, the wrapper 224 may emulate or simulate a particular type of a mobile device platform for the application 227.

The services 230 may correspond to a variety of different network services that provide access to resources or perform various functions. For example, various services 230 may allow for storage, retrieval, and deletion of data; creating, terminating, configuring, or accessing virtual machine instances; accessing device resources or hardware features; accessing social networking data or other forms of electronic communication; performing computation functions under a utility computing model; and so on.

The data stored in the data store 215 includes, for example, use cases 233, an execution log 236, accounts 239, databases 242, permission failure reports 245, maximal permissions 248, minimal permissions 251, application manifests 254, static analysis rules 257, a machine learning (ML) model 260, and potentially other data. The use cases 233 correspond to sample actions that may be performed using the application 227, either through a simulated user interactive mode with a user interface or through interaction with external services 230 or other systems. The use cases 233 may be selected so as to provide maximal code coverage in the application 227 for a dynamic analysis of the application 227 when executed in many different scenarios. In one approach, the use cases 233 may be preconfigured and specified by a developer of the application 227. In another approach, the use cases 233 may be automatically generated by the application testing service 221 through a static analysis of the source code or compiled code of the application 227. In still another approach, the use cases 233 may be manually specified by a developer by way of the developer manually interacting with the application 227 through a user interface.

The execution log 236 records information related to the execution of an application 227 in the wrapper 224 by the application testing service 221. In particular, the execution log 236 may include version information, environmental information, recorded operations 263, and/or recorded permissions 266. The recorded operations 263 correspond to the operations performed by the application 227 as intercepted by the wrapper 224, while the recorded permissions 266 correspond to the permissions necessary to execute the recorded operations 263.

The accounts 239 are accounts with the services 230 used in order to interact with the services 230. The accounts 239 may be associated with varying levels of permissions, and some accounts 239 may be associated with fees or subscriptions corresponding to allowable usage of the service 230. In some cases, a service 230 may be interacted with on an anonymous basis, without requiring an account 239. Information relating to the accounts 239 in the data store 215 may include, for example, usernames, hypertext transfer protocol (HTTP) cookies, passwords and other security credentials, personalizations, and permissions.

The databases 242 correspond to data sets that may be used by the applications 227. As an example, a database 242 may correspond to a relational database having a database schema with tables. As another example, a database 242 may correspond to data stored and retrieved via a service 230. Various permissions may be associated with a database 242 and a corresponding account 239 that may be used to access the database 242. Accounts 239 may be given read, write, delete, and/or other types of access to specific tables or portions within a database 242.

The permission failure reports 245 may be collected when the application 227 is deployed via the production computing environment 206 and an operation fails due to a lack of permissions to perform the operation. The failure may be reported back to the application testing service 221 or to another service and collected for further analysis and improvement of the application testing service 221 for future permission discovery.

The maximal permissions 248 correspond to a maximal set of permissions that may be given to an application 227 while executing in the testing computing environment 203. Generally, the applications 227 may be given unlimited permissions to nearly all services 230 and databases 242 in the testing computing environment 203. However, if desired, the maximal permissions 248 may exclude certain permissions. For example, the maximal permissions 248 may still require that the application 227 be executed by an authenticated developer user account and within its own partition in the testing computing environment 203.

The minimal permissions 251 correspond to a subset of the set of maximal permissions 248 that correspond to the minimal permissions necessary to perform the operations of the application 227. For example, under the maximal permissions 248, the application 227 may be given read, write, and delete access to all tables within a certain database 242. However, upon execution of the application 227 for various use cases 233, the application testing service 221 may observe that the application 227 only needs read access to one specific table in the database 242. Thus, the minimal permissions 251 would exclude write and delete access to that table, and also read, write, and delete access to all other tables in the database 242.

The application manifests 254 correspond to manifests that may be distributed with an application 227 to configure installation. In particular, an application manifest 254 may enumerate the specific permissions that are requested for the application 254. For example, a weather application 227 may request access to a location service 230 to determine the current location of the mobile device in order to localize weather information. Upon installation on a computing device, the operating system or installation service may read the application manifest 254 and automatically grant the requested permissions or prompt a user to confirm whether the requested permissions should be granted.

The static analysis rules 257 configure a static analysis on the source code or compiled code of the application 227 by the application testing service 221. The static analysis of the code is designed to recognize permissions that may be required of the application 227 in order to execute portions of the code. For example, the static analysis may recognize a particular application programming interface (API) call, such as a network call to a service 230. The code may specify a domain name or network address. Upon detecting such an API call in the code, the application testing service 221 may record that the application 227 requires access to the API and to the particular method invoked.

The machine learning model 260 may be used to aid the static analysis and/or dynamic analysis of the applications 227 for automated permission discovery. In particular, the permission failure reports 245 may be used as feedback to the machine learning model 260 to improve recognition of operations and the permissions that they require.

The components executed on the production computing environment 206, for example, include services 269 and other applications, services, processes, systems, engines, or functionality not discussed in detail herein. The services 269 are production versions of the services 230 and may correspond to a variety of different network services that provide access to resources or perform various functions. For example, various services 269 may allow for storage, retrieval, and deletion of data; creating, terminating, configuring, or accessing virtual machine instances; accessing device resources or hardware features; accessing social networking data or other forms of electronic communication; performing computation functions under a utility computing model; and so on.

The data stored in the data store 218 includes, for example, accounts 272, databases 275, and potentially other data. The accounts 272 are accounts with the services 269 used in order to interact with the services 269. The accounts 272 may be associated with varying levels of permissions, and some accounts 272 may be associated with fees or subscriptions corresponding to allowable usage of the service 269. In some cases, a service 269 may be interacted with on an anonymous basis, without requiring an account 272. Information relating to the accounts 272 in the data store 218 may include, for example, usernames, hypertext transfer protocol (HTTP) cookies, passwords and other security credentials, personalizations, and permissions.

The databases 275 correspond to production data sets that may be used by the applications 227. As an example, a database 275 may correspond to a relational database having a database schema with tables. The database schema of the database 275 and the database 242 may be identical, but the database 242 may be created with simulated data. As another example, a database 275 may correspond to data stored and retrieved via a service 269. Various permissions may be associated with a database 275 and a corresponding account 272 that may be used to access the database 275. Accounts 272 may be given read, write, delete, and/or other types of access to specific tables or portions within a database 275.

The client 209 is representative of a plurality of client devices that may be coupled to the network 212. The client 209 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, smartwatches, head mounted displays, voice interface devices, or other devices. The client 209 may include a display 278. The display 278 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client 209 may be configured to execute various applications such as a client application 282 and/or other applications. The client application 282 may be executed in a client 209, for example, to access network content served up by the testing computing environment 203 and/or other servers, thereby rendering a user interface 100 on the display 278. To this end, the client application 282 may comprise, for example, a browser, a dedicated application, etc., and the user interface 100 may comprise a network page, an application screen, etc. The client 209 may be configured to execute applications beyond the client application 282 such as, for example, email applications, social networking applications, word processors, spreadsheets, and/or other applications.

Figure 3:
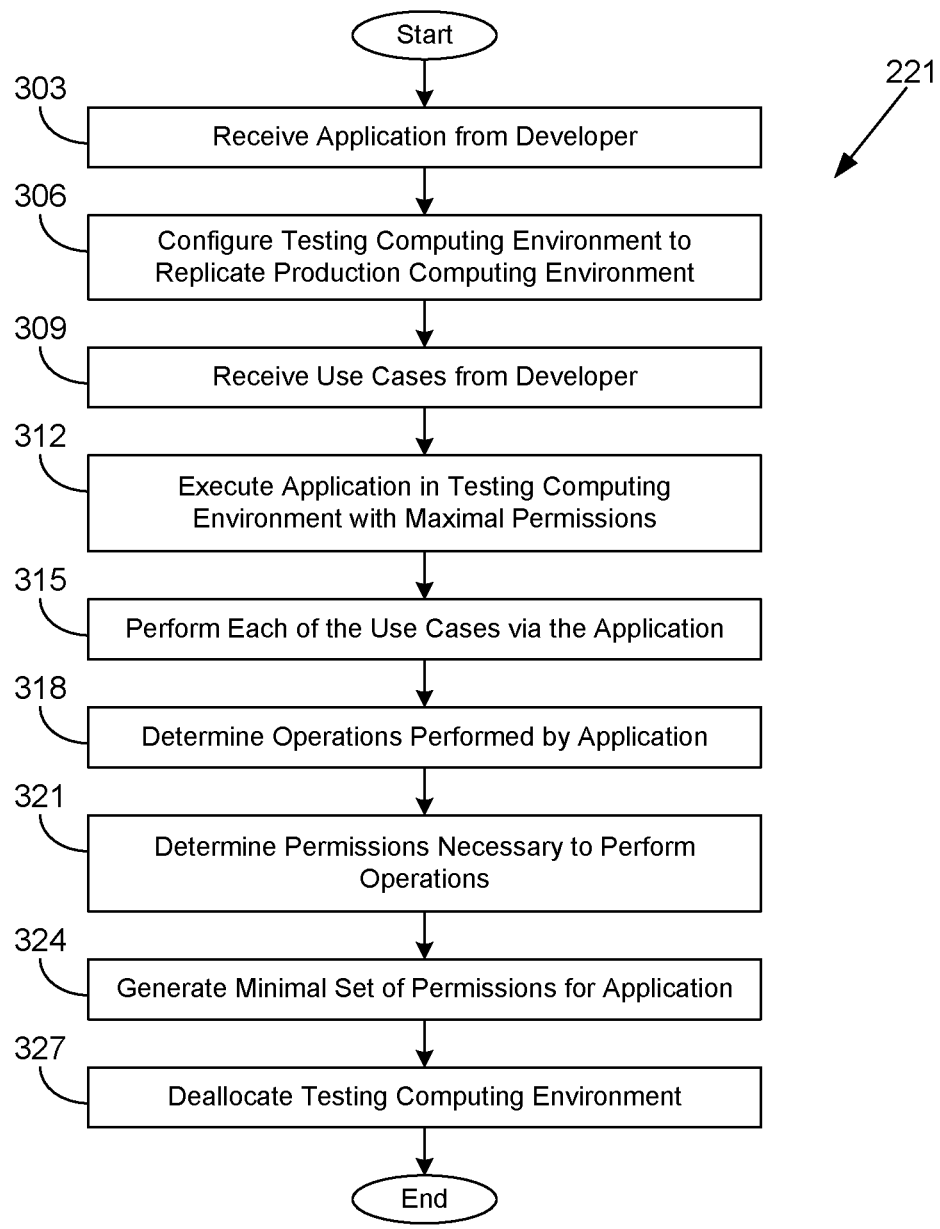
FIGS. 3-5 are flowcharts illustrating examples of functionality implemented as portions of an application testing service executed in a testing computing environment in the networked environment of FIG. 2 according to various embodiments of the present disclosure.

Referring next to FIG. 3, shown is a flowchart that provides one example of the operation of a portion of the application testing service 221 according to various embodiments. It is understood that the flowchart of FIG. 3 provides merely an example of the many different types of functional arrangements that may be employed to implement the operation of the portion of the application testing service 221 as described herein. As an alternative, the flowchart of FIG. 3 may be viewed as depicting an example of elements of a method implemented in the testing computing environment 203 (FIG. 2) according to one or more embodiments.

Beginning with box 303, the application testing service 221 receives an application 227 (FIG. 2) from a developer. For example, the developer may use the client application 282 (FIG. 2) to upload the application 227 over the network 212 to the application testing service 221. Alternatively, the developer may configure the application testing service 221 with a uniform resource locator (URL) such that the application testing service 221 is able to download the application 227 from a service via the network 212.

In box 306, the application testing service 221 automatically configures the testing computing environment 203 to replicate the production computing environment 206 (FIG. 2). This may involve creating replicas of accounts 272 (FIG. 2), databases 275 (FIG. 2), services 269 (FIG. 2), and/or other aspects of the production computing environment 206. In some cases, the application testing service 221 may update or synchronize previously created copies in the testing computing environment 206 with production versions in the production computing environment 206. Also, this step may also involve generating simulated data for the databases 242 (FIG. 2) and/or test accounts 239 (FIG. 2). The replicated databases 242 may correspond to a separate partition on the same database management system as the databases 275, or the replicated databases 242 may correspond to a separate or emulated database management system.

In box 309, the application testing service 221 receives a set of use cases 233 (FIG. 2) from the developer. For example, the developer may upload a file that specifies the use cases in a predetermined format. Alternatively, the developer may interact with the application 227 and the user input such as keystrokes, mouse movements, touch movements, etc., may be recorded. In other embodiments, the use cases 233 may be generated automatically via automated monkey testing.

In box 312, the application testing service 221 executes the application 227 in the testing computing environment 203, where the application 227 is configured to have a maximum set of permissions. It is noted that the maximum set of permissions may not be every possible permission in the testing computing environment 203, and users may specify fewer permissions at the outset if it is known that certain permissions will not be used. The application 227 is executed through a wrapper 224 that intercepts and records operations performed by the application 227. For example, the wrapper 224 may intercept API calls, system calls, network communication, and so forth, from the application 227. In addition, the wrapper 224 may simulate or emulate aspects of the production computing environment 206. For example, the wrapper 224 may execute in a hosted computing environment to emulate a type of a mobile device, such as a smartphone platform.

In box 315, the application testing service 221 performs each of the use cases 233 via the application 227. This may be done automatically or manually via a user controlling the application 227 via a user interface. If performed manually, the application testing service 221 may present one or more user interfaces that enables the user to indicate when the manual testing begins and when the manual testing ends. In box 318, the application testing service 221 determines the operations performed by the application 227 as part of the use cases. The operations that are performed may be recorded in the execution log 236 (FIG. 2) as recorded operations 263 (FIG. 2).

In box 321, the application testing service 221 determines the permissions necessary to perform the operations. The permissions may be recorded in the execution log 236 as recorded permissions 266 (FIG. 2). The determined permissions may be lesser than the permissions actually granted to the application 227 in this testing phase. For example, the application 227 may be granted read, write, and delete access to a database 242, but the only operations performed relative to the database 242 are read operations. As such, the recorded permission 266 would indicate a read permission, but not a write or a delete permission.

In box 324, the application testing service 221 generates a minimum set of permissions for the application 227 as determined through observation of the minimal permissions necessary to perform the operations invoked through the use cases 233. This minimum set of permissions may be a subset of the permissions that were initially granted to the application 227 in the testing computing environment 203.

In box 327, the application testing service 221 may deallocate the testing computing environment 203. For example, the application testing service 221 may reinitialize the testing computing environment 203, which may include wiping data such as the accounts 239 and databases 242. Also, the application testing service 221 may release or deallocate resources associated with the services 230, which could include terminating processes and/or virtual machine instances. Thereafter, the operation of the portion of the application testing service 221 ends.

Figure 4:
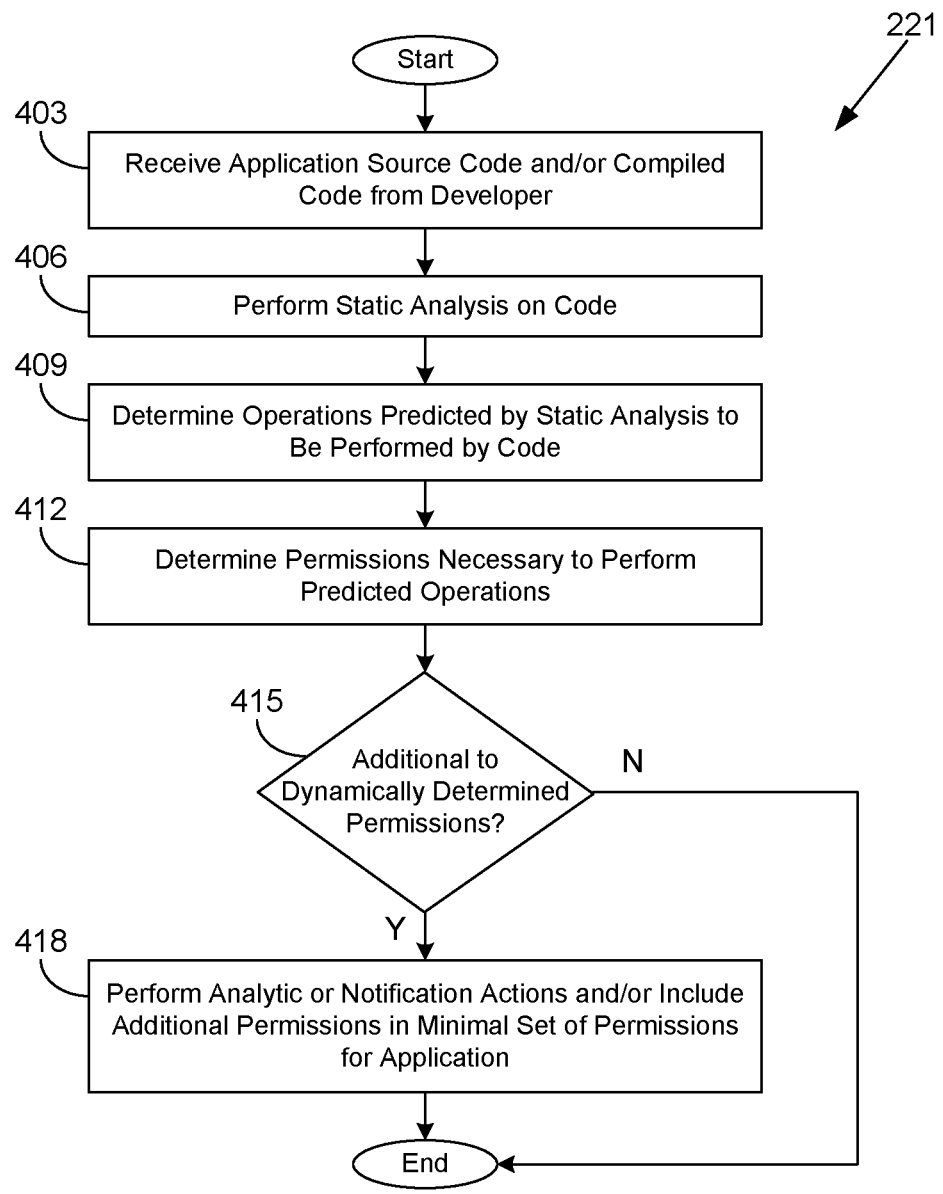

Turning now to FIG. 4, shown is a flowchart that provides one example of the operation of another portion of the application testing service 221 according to various embodiments. It is understood that the flowchart of FIG. 4 provides merely an example of the many different types of functional arrangements that may be employed to implement the operation of the portion of the application testing service 221 as described herein. As an alternative, the flowchart of FIG. 4 may be viewed as depicting an example of elements of a method implemented in the testing computing environment 203 (FIG. 2) according to one or more embodiments.

Beginning with box 403, the application testing service 221 receives source code and/or compiled code for the application 227 (FIG. 2) from a developer user. For example, the user may upload the code to the application testing service 221, or the user may provide a URL for the application testing service 221 to download the code from a service via the network 212.

In box 406, the application testing service 221 performs a static analysis on the code of the application 227. How the static analysis is performed may be controlled by the static analysis rules 257 (FIG. 2) and may be driven by a machine learning model 260 (FIG. 2). In box 409, the application testing service 221 determines operations predicted by the static analysis to be performed by the application 227. In box 412, the application testing service 221 determines the permissions necessary to perform the predicted operations.

In box 415, the application testing service 221 determines whether the permissions ascertained through this static analysis are additional to the permissions determined from the dynamic analysis of the flowchart of FIG. 3. For example, the static analysis may identify a network host to be whitelisted for the application 227 that would not have been identified through the use case testing in FIG. 3. If there are no additional permissions ascertained through the static analysis, the operation of the portion of the application testing service 221 ends. Otherwise, the application testing service 221 continues to box 418.

In box 418, the application testing service 221 may perform one or more analytic or notification actions in response to detecting the additional permissions. For example, the detection of additional permissions through static analysis may indicate that the use cases 233 (FIG. 2) that were tested were somehow incomplete. The application testing service 221 may analyze the code of the application 227 to determine segments associated with these additional permissions. These segments may correspond to unused code, or code that is not reachable through normal flows of execution, which may be removed from the application 227. Alternatively, if these segments should be reached and executed, the lack of execution of these segments by the application 227 performing the use cases 233 may be indicative of new use cases 233 that should be added. The developer user may be notified of these additional permissions and/or the portions of the code that are associated with these additional permissions. In some cases, the application testing service 221 may generate additional use cases 233 that may cause the unused code to be executed. Also, the application testing service 221 may include the additional permissions necessary to perform the predicted operations in a minimum set of permissions deemed necessary for the application 227. Thereafter, the operation of the portion of the application testing service 221 ends.

Figure 5:
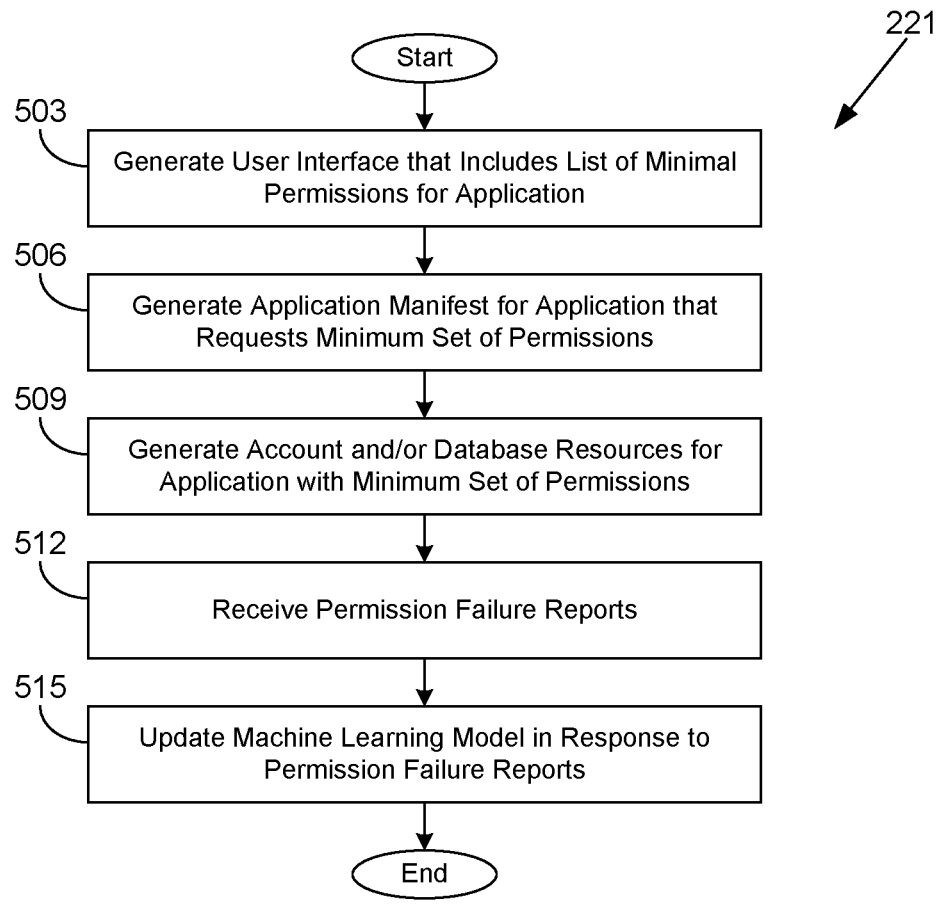

Moving on to FIG. 5, shown is a flowchart that provides one example of the operation of still another portion of the application testing service 221 according to various embodiments. It is understood that the flowchart of FIG. 5 provides merely an example of the many different types of functional arrangements that may be employed to implement the operation of the portion of the application testing service 221 as described herein. As an alternative, the flowchart of FIG. 5 may be viewed as depicting an example of elements of a method implemented in the testing computing environment 203 (FIG. 2) according to one or more embodiments.

Beginning with box 503, after performing the dynamic analysis of FIG. 3 or the static analysis of FIG. 4, the application testing service 221 generates a user interface 100 (FIG. 1) that includes a list of a minimal set of permissions for the application 227 (FIG. 2). The list may be shown in a user-readable format and/or may be made exportable in a format such as XML. In particular, in box 506, the application testing service 221 may automatically generate an application manifest 254 (FIG. 2) for the application 227 that requests the minimum set of permissions for the application 227. The application testing service 221 may use other metadata provided through a development interface to create the application manifest 254.

In box 509, the application testing service 221 may automatically generate an account 272 (FIG. 2) or a resources of a database 275 (FIG. 2) in the production computing environment 206 that are configured with the minimum set of permissions on behalf of the application 227. Thus, when the application 227 is deployed, the application 227 can be configured to use the accounts 272 and/or databases 275 that are preconfigured with the appropriate minimal permissions.

In box 512, the application testing service 221 may receive permission failure reports 245 caused by execution of the application 227 via the production computing environment 206. The developer and/or other users may be sent notifications of the permission failure reports 245. In some cases, the permission failure reports 245 may indicate a defect in the application 227 or that the application 227 has been compromised by a malicious user.

In addition, in box 515, the application testing service 221 may use the permission failure reports 245 to update a machine learning model 260 that is used for performing the static analysis of FIG. 4 and/or the dynamic analysis of FIG. 3. For example, a failure to determine that a permission was necessary may be used to alter the machine learning model 260 such that a similar operation when observed will be given the needed permission upon future development testing. Thereafter, the operation of the portion of the application testing service 221 ends.

Figure 6:
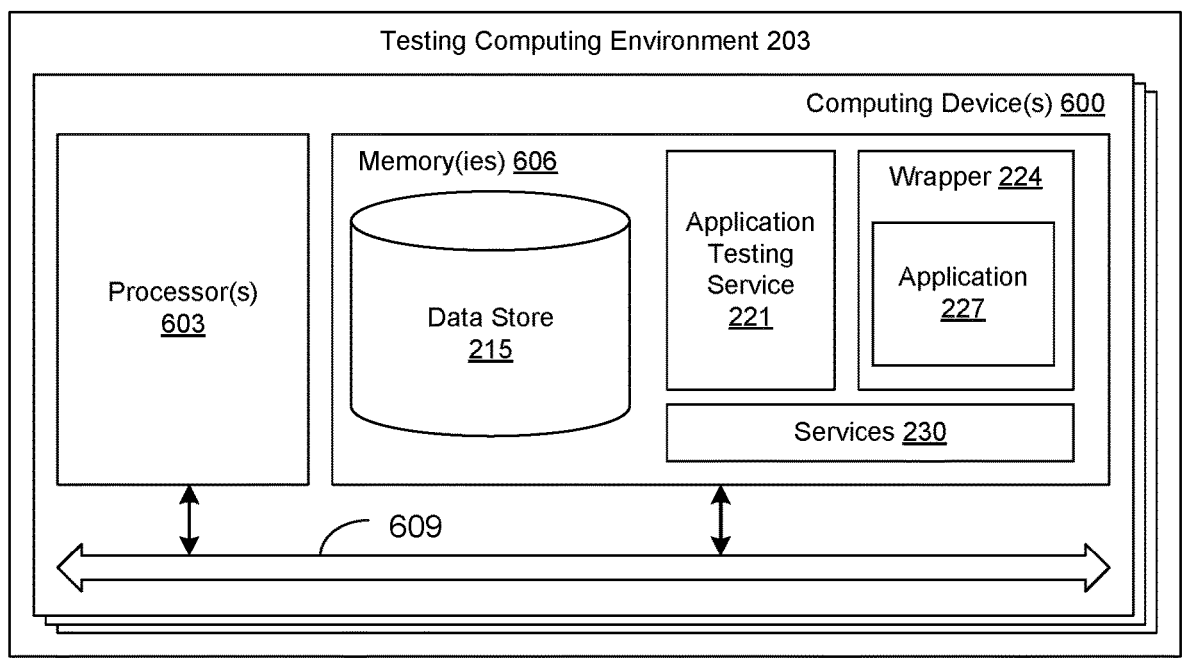
FIG. 6 is a schematic block diagram that provides one example illustration of a testing computing environment employed in the networked environment of FIG. 2 according to various embodiments of the present disclosure.

With reference to FIG. 6, shown is a schematic block diagram of the testing computing environment 203 according to an embodiment of the present disclosure. The testing computing environment 203 includes one or more computing devices 600. Each computing device 600 includes at least one processor circuit, for example, having a processor 603 and a memory 606, both of which are coupled to a local interface 609. To this end, each computing device 600 may comprise, for example, at least one server computer or like device. The local interface 609 may comprise, for example, a data bus with an accompanying address/control bus or other bus structure as can be appreciated.

Stored in the memory 606 are both data and several components that are executable by the processor 603. In particular, stored in the memory 606 and executable by the processor 603 are the application testing service 221, the wrapper 224, the application 227, the services 230, and potentially other applications. Also stored in the memory 606 may be a data store 215 and other data. In addition, an operating system may be stored in the memory 606 and executable by the processor 603.

It is understood that there may be other applications that are stored in the memory 606 and are executable by the processor 603 as can be appreciated. Where any component discussed herein is implemented in the form of software, any one of a number of programming languages may be employed such as, for example, C, C++, C #, Objective C, Java®, JavaScript®, Perl, PHP, Visual Basic®, Python®, Ruby, Flash®, or other programming languages.

A number of software components are stored in the memory 606 and are executable by the processor 603. In this respect, the term "executable" means a program file that is in a form that can ultimately be run by the processor 603. Examples of executable programs may be, for example, a compiled program that can be translated into machine code in a format that can be loaded into a random access portion of the memory 606 and run by the processor 603, source code that may be expressed in proper format such as object code that is capable of being loaded into a random access portion of the memory 606 and executed by the processor 603, or source code that may be interpreted by another executable program to generate instructions in a random access portion of the memory 606 to be executed by the processor 603, etc. An executable program may be stored in any portion or component of the memory 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 606 is defined herein as including both volatile and nonvolatile memory and data storage components. Volatile components are those that do not retain data values upon loss of power. Nonvolatile components are those that retain data upon a loss of power. Thus, the memory 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 603 may represent multiple processors 603 and/or multiple processor cores and the memory 606 may represent multiple memories 606 that operate in parallel processing circuits, respectively. In such a case, the local interface 609 may be an appropriate network that facilitates communication between any two of the multiple processors 603, between any processor 603 and any of the memories 606, or between any two of the memories 606, etc. The local interface 609 may comprise additional systems designed to coordinate this communication, including, for example, performing load balancing. The processor 603 may be of electrical or of some other available construction.

Although the application testing service 221, the wrapper 224, the application 227, the services 230, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3-5 show the functionality and operation of an implementation of portions of the application testing service 221. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 603 in a computer system or other system. The machine code may be converted from the source code, etc. If embodied in hardware, each block may represent a circuit or a number of interconnected circuits to implement the specified logical function(s).

Although the flowcharts of FIGS. 3-5 show a specific order of execution, it is understood that the order of execution may differ from that which is depicted. For example, the order of execution of two or more blocks may be scrambled relative to the order shown. Also, two or more blocks shown in succession in FIGS. 3-5 may be executed concurrently or with partial concurrence. Further, in some embodiments, one or more of the blocks shown in FIGS. 3-5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the application testing service 221, the wrapper 224, the application 227, and the services 230, that comprises software or code can be embodied in any non-transitory computer-readable medium for use by or in connection with an instruction execution system such as, for example, a processor 603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the application testing service 221, the wrapper 224, the application 227, and the services 230, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 600, or in multiple computing devices 600 in the same testing computing environment 203.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device, wherein when executed the program causes the at least one computing device to at least:
   generate a testing computing environment that replicates a production computing environment;
   execute an application in the testing computing environment, wherein the application is given a maximal set of permissions in the testing computing environment;
   perform a set of use cases for the application while the application is executing in the testing computing environment;
   automatically determine a first set of operations invoked by the application to perform the set of use cases;
   automatically determine a second set of operations predicted to be invoked by the application through a static analysis of the application; and
   automatically determine a subset of the maximal set of permissions that corresponds to a minimal set of permissions necessary to invoke the first set of operations and the second set of operations.

2. The non-transitory computer-readable medium of claim 1, wherein when executed the program causes the at least one computing device to at least automatically create an account with a network service, wherein the account is configured based at least in part on the subset of the maximal set of permissions.

3. The non-transitory computer-readable medium of claim 1, wherein when executed the program further causes the at least one computing device to at least:
   determine a set of permissions that corresponds to permissions in the maximal set of permissions that are not in the minimal set of permissions;
   determine at least one code segment of the application that is associated with the set of permissions; and
   generate at least one additional use case for testing the at least one code segment.

4. A system, comprising:
   at least one computing device; and
   an application testing service executable in the at least one computing device, wherein when executed the application testing service causes the at least one computing device to at least:
      execute an application in a testing computing environment that replicates a production computing environment, wherein the application is given a maximal set of permissions in the testing computing environment;
      perform a set of use cases for the application while the application is executing in the testing computing environment;
      automatically determine a set of operations invoked by the application to perform the set of use cases; and
      automatically determine a subset of the maximal set of permissions that corresponds to a minimal set of permissions necessary to invoke the set of operations.

5. The system of claim 4, wherein when executed the application testing service further causes the at least one computing device to at least automatically generate the testing computing environment.

6. The system of claim 5, wherein when executed the application testing service further causes the at least one computing device to at least automatically deallocate at least one resource of the testing computing environment after performing the set of use cases.

7. The system of claim 5, wherein automatically generating the testing computing environment further comprises creating a test account with a network service.

8. The system of claim 5, wherein automatically generating the testing computing environment further comprises generating a replica of a database from the production computing environment in the testing computing environment.

9. The system of claim 4, wherein when executed the application testing service further causes the at least one computing device to at least cause a user interface to be rendered that shows a listing of the subset of the maximal set of permissions.

10. The system of claim 4, wherein when executed the application testing service further causes the at least one computing device to at least create an account with a network service based at least in part on the subset of the maximal set of permissions.

11. The system of claim 4, wherein when executed the application testing service further causes the at least one computing device to at least:
    perform a static analysis on the application;
    determine another set of operations predicted to be invoked by the application based at least in part on the static analysis; and
    wherein the subset of the maximal set of permissions is automatically determined based at least in part on the other set of operations predicted to be invoked by the application.

12. The system of claim 4, wherein when executed the application testing service further causes the at least one computing device to at least receive a report indicating that the application, when executed in the production computing environment having the subset of the maximal set of permissions, could not complete a requested operation due to a permission failure.

13. A system, comprising:
    at least one computing device; and
    an application testing service executable in the at least one computing device, wherein when executed the application testing service causes the at least one computing device to at least:
       execute an application in a testing computing environment that replicates a production computing environment, wherein the application is given a set of permissions in the testing computing environment;
       perform a set of use cases for the application while the application is executing in the testing computing environment;
       determine a set of operations invoked by the application to perform the set of use cases;
       generate a subset of the set of permissions that corresponds to a minimal set of permissions necessary to invoke the set of operations, wherein the subset of the set of permissions is generated based at least in part on a machine learning model;

receive a report indicating that the application, when executed in the production computing environment having the subset of the set of permissions, could not complete a requested operation due to a permission failure; and adjust the machine learning model based at least in part on the permission failure.

14. The system of claim 12, wherein when executed the application testing service further causes the at least one computing device to at least send to a developer of the application a notification of the permission failure.

15. A method, comprising:

executing, via at least one of one or more computing devices, an application in a testing computing environment that replicates a production computing environment, wherein the application is given a maximal set of permissions in the testing computing environment;

performing, via at least one of the one or more computing devices, a set of use cases for the application while the application is executing in the testing computing environment;

automatically determining, via at least one of the one or more computing devices, a set of operations invoked by the application to perform the set of use cases;

automatically determining, via at least one of the one or more computing devices, a subset of the maximal set of permissions that corresponds to a minimal set of permissions necessary to invoke the set of operations; and generating, via at least one of the one or more computing devices, an application manifest for the application requesting the minimal set of permissions.

16. The method of claim 15, further comprising:

determining, via at least one of the one or more computing devices, another set of operations predicted by a static analysis of the application to be invoked by the application; and including, via at least one of the one or more computing devices, at least one permission necessary to invoke the other set of operations in the subset of the maximal set of permissions.

17. The method of claim 15, wherein the testing computing environment emulates a mobile device.

18. The method of claim 15, wherein determining the set of operations invoked by the application to perform the set of use cases further comprises intercepting, via at least one of the one or more computing devices, at least one application programming interface (API) call made by the application.

19. The method of claim 18, further comprising, in response to intercepting the at least one API call, sending to a network service, via at least one of the one or more computing devices, data embodying a version identifier of the application and a set of permissions required to complete the API call.

20. The method of claim 15, further comprising generating, via at least one of the one or more computing devices, a simulation of a database from the production computing environment in the testing computing environment, the simulation having a same database schema as the database and simulated data.

* * * * *